US006522343B2

(12) United States Patent
Sobeski et al.

(10) Patent No.: US 6,522,343 B2
(45) Date of Patent: *Feb. 18, 2003

(54) HOSTING OBJECTS IN A WINDOWED ENVIRONMENT

(75) Inventors: David A. Sobeski, Redmond, WA (US); Tracy C. Sharpe, Seattle, WA (US)

(73) Assignee: Microsoft Corporation, Redmond, WA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/115,814

(22) Filed: Jul. 15, 1998

(65) Prior Publication Data

US 2002/0054124 A1 May 9, 2002

(51) Int. Cl.[7] .............................................. G06F 17/00

(52) U.S. Cl. ....................... 345/744; 345/762

(58) Field of Search ................................ 345/333, 335, 345/339, 762, 744, 764; 709/303, 305, 39

(56) References Cited

U.S. PATENT DOCUMENTS

| | | | |
|---|---|---|---|
| 5,515,536 A | | 5/1996 | Corbett et al. |
| 5,815,657 A | * | 9/1998 | Williams et al. ............. 709/305 |
| 5,831,609 A | * | 11/1998 | London et al. ............. 345/744 |
| 5,964,836 A | * | 10/1999 | Rowe et al. ................ 709/221 |
| 6,016,484 A | * | 1/2000 | Williams et al. ............. 705/39 |
| 6,047,318 A | | 4/2000 | Becker et al. |
| 6,054,985 A | * | 4/2000 | Morgan et al. ............. 345/342 |
| 6,061,721 A | | 5/2000 | Ismael et al. |
| 6,115,039 A | * | 9/2000 | Karren et al. ................ 345/744 |
| 6,209,125 B1 | | 3/2001 | Hamilton et al. |

OTHER PUBLICATIONS

"JavaBeans Migration Assistant for ActiveX: Migrating Active X Components to JavaBeans" [online]. IBM posted Apr. 5, 1998 [retrieved on Nov. 29, 1999]. Retrieved from the Internet:<URL:www.7.software.ibm>.

"SUN Enriches JavaBeans Components Architectures", Press Release [online]. SUN Microsystems, Jul. 1997 [retrieved on Dec. 3, 1999]. Retrieved from the Internet:<URL:www.sun.com/smi/Press/sunflash/>.

"SUN Microsystems' JavaBeans Development Kit in Full–Scale Deployment" Press Release [online]. SUN Microsystem, Mar. 1997 [retrieved on Dec. 3, 1999]. Retrieved from the Internet:<URL:www.sun.com/smi/Press/sunflash/1997–03/sunflash.970311.11733.html>.

"The JavaBeans Bridge for ActiveX" Datasheet [online]. SUN Microsystems, Feb. 1998 [retrieved on Nov. 29, 1999]. Retrieved from the Internet:<URL:www.su.com/beans/software/bridge/>.

"Going Native with J/Direct," accessed Jun. 18, 2000 @ wysiwyg://zz/http://msdn.microsoft.com/library/welcome/dsmsdn/msdn_drgvinat.htm, 16 pages.

(List continued on next page.)

*Primary Examiner*—Cao H. Nguyen
(74) *Attorney, Agent, or Firm*—Klarquist Sparkman, LLP

(57) ABSTRACT

Hosting objects within a windowed environment is disclosed. In one embodiment, a computerized system includes a first object and a second object. The first object is of a first type, and requires siting within a windowed environment. The second object is of a second type, and sites the first object within the windowed environment. The first object may be a Component Object Model (COM)-type object typically utilized with versions of the Microsoft® Windows® operating system, the windowed environment may be a Java windowed environment, and the second object may be a Java object, such as a Java bean.

21 Claims, 4 Drawing Sheets

OTHER PUBLICATIONS

Morrison, "Integrating Java and ActiveX," Java 1.1 Unleashed, Chapter 47, 9 pages, accessed Jul. 17, 2000 @ http://hplasim2.univ–lyonl.fr/c–ray/bks/java/htm/ch47.htm, prior to filing date.

Hughes, "JavaBeans and ActiveX go head to head," http://www.javaworld.com/, pp. 1–11 (Mar. 1997).

The Common Object Request Broker: Architecture and Specification, Digital Equipment Co., Hewlett–Packard Company, HyperDesk Co., NCR Co., Object Design, Inc., SunSoft, Inc., pp. 19–108 (Dec. 1993).

Evans et al., "Zones, Contracts and Absorbing Change: An Approach to Software Evolution," ACM, pp. 415–434 (Nov. 1999).

Claverie, "Working the'NET: developing applications with the Internet Information Server and Visual Basic ActiveX controls," ACM, pp. 158–162 (Apr. 1998).

Java.sun.com," JAVA Plug–in Scripting," http://java.sun.com/, pp. 1–19 (Oct. 1999).

Rogerson, "Inside Com—Microsoft's Component Object Model," published by Microsoft Press, Redmond, WA, pp. 1–376 (1997).

"The Common Object Request Broker:Architecture and Specification," CORBA V2.0 (Jul. 1995).

Brockschmidt, "Inside OLE," Second Edition, Chapter 3: Type Information, pp. 145–186, Chapter 14: OLE Automation and Automation Objects, pp. 635–760. Microsoft Press (1995).

Vanhelsuwé, "Mastering Java Beans," Chapter 10: Java Core Reflection and Bean Introspection, pp. 592–652 (1997).

Robinson et al., "ActiveX Magic: An ActiveX Control and DCOM Sample Using ATL," MSDN Online Web Workshop (May 1997).

"Sunsoft Delivers Critical Technology for Networked Object Interoperability," Sun.com (1995).

Jonathan Locke, "Taking the Wraps Off Microsoft Visual J++," http://www.microsoft.com/mind/1296/visualjava/visualj.htm/, pp. 1–12 (Dec. 1996).

Java, "The source for Java Technology," http://java.sun.com/pr/1997/april./pr970402–10.html/, pp. 1–3 (Apr. 1997).

* cited by examiner

HOSTING OBJECTS IN A WINDOWED ENVIRONMENT

FIELD OF THE INVENTION

This invention relates generally to windowed environments, and more particularly to hosting objects in such environments.

BACKGROUND OF THE INVENTION

Windowed environments (i.e., graphical user interfaces) and object-oriented programming methodologies have become increasingly popular. For example, versions of the Microsoft® Windows(g operating system provide for a windowed environment in which users navigate within the environment via a pointer. From a programming perspective, programmers utilize objects such as Component Object Model (COM)-type components (e.g., ActiveX controls) to more easily develop software for the operating system. Objects generally implement services that can be accessed by other objects; each object supports one or more interfaces, each of which includes one or more methods. Other objects (i.e., clients) can access the services provided by this object only by invoking the methods in the object's interfaces—they do not have direct access to the object's data.

Another windowed environment is provided by the Java programming language. In the case of Java, Java objects are sometimes known as Java components and/or Java beans. A fundamental problem encountered by programmers is that Java objects cannot be directly accessed by COM objects and vice-versa. For example, within a Java windowed environment, a COM object is not amenable for direct utilization therein. The Java windowed environment only works directly with Java objects. Thus, a programmer who has painstakingly created one or more COM objects, such as various ActiveX controls, must rewrite these objects or controls for use with the Java windowed environment. This is disadvantageous, since object development takes time, and may force the programmer to completely redebug the corresponding Java objects, even if the COM objects were already debugged.

Therefore, there is a need for a manner by which COM objects, such as ActiveX controls, can be accessed with and utilized within a Java windowed environment. Such a solution should not force the programmer to rewrite the COM objects as Java objects, and thus should not force the programmer to have to go through the debugging process again with the rewritten Java objects corresponding to the already debugged COM objects.

SUMMARY OF THE INVENTION

The above-identified problems, shortcomings and disadvantages with the prior art, as well as other problems, shortcoming and disadvantages, are solved by the present invention, which will be understood by reading and studying the specification and the drawings. In one embodiment of the invention, a computerized system includes a first object and a second object. The first object is of a first type, and requires siting within a windowed environment. The second object is of a second type, and sites the first object within the windowed environment. In a particular embodiment, the first object is a Component Object Model (COM)-type object typically utilized with versions of the Microsoft® Windows® operating system, the windowed environment is a Java windowed environment, and the second object is a Java object, such as a Java bean.

Thus, the invention provides for advantages not found in the prior art. For example, in the case of a COM-type (first) object, a programmer does not have to rewrite the object in Java to utilize the object within a Java windowed environment. Rather, a Java (second) object acts as a container, to site the COM-type object within the Java windowed environment. Thus, the first object is utilizable within the Java windowed environment through the second object, without having to be specifically rewritten in the Java programming language as a Java object.

The invention includes computerized systems, methods, computers, and computer-readable media of varying scope. Besides the embodiments, advantages and aspects of the invention described here, the invention also includes other embodiments, advantages and aspects, as will become apparent by reading and studying the drawings and the following description.

DETAILED DESCRIPTION OF THE INVENTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

The detailed description is divided into four sections. In the first section, the hardware and the operating environment in conjunction with which embodiments of the invention may be practiced are described. In the second section, a computerized system of one embodiment of the invention is presented. In the third section, a computerized method in accordance with an embodiment of the invention is provided. Finally, in the fourth section, a conclusion of the detailed description is provided.

Hardware and Operating Environment

Figure 1:
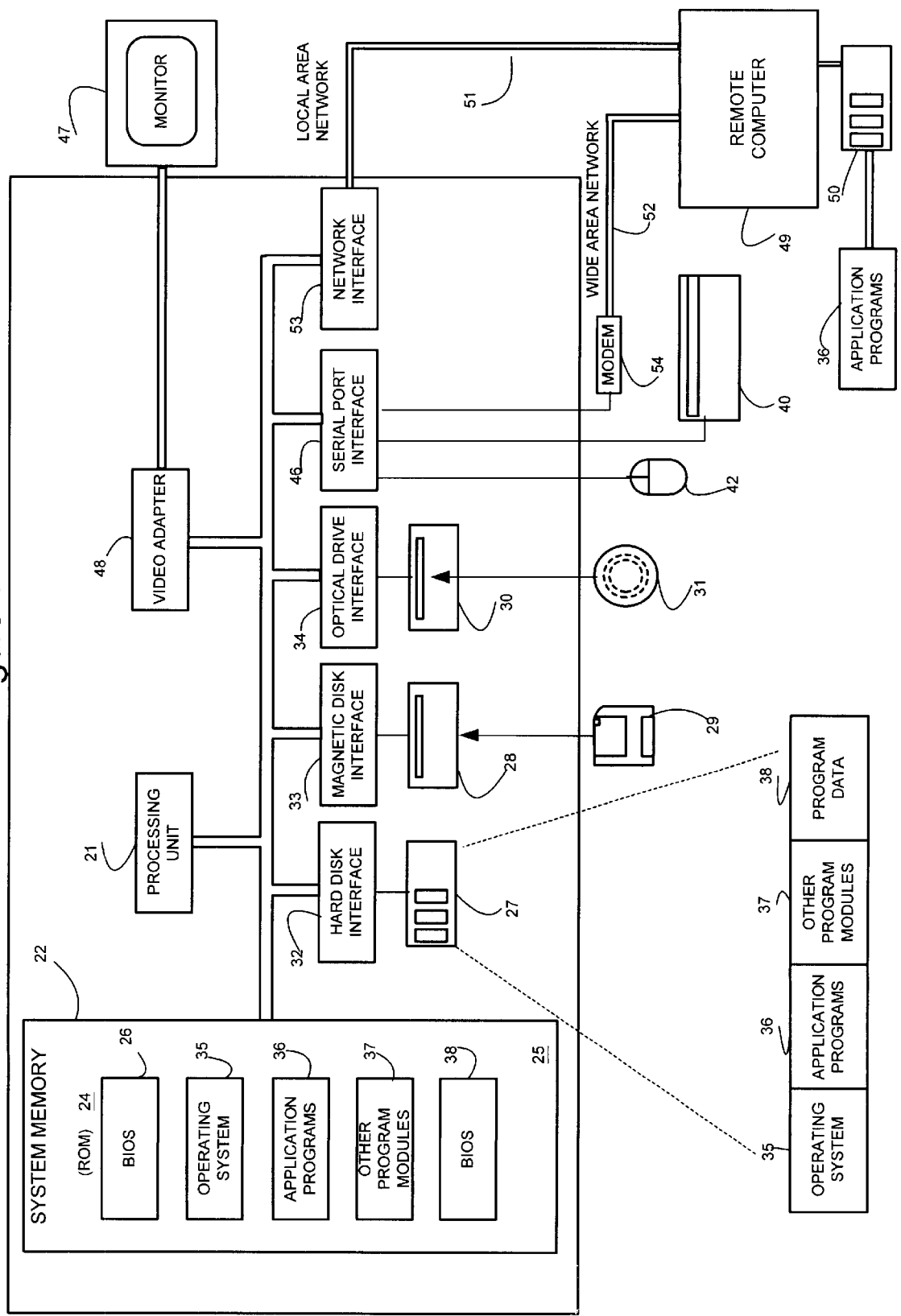
FIG. 1 shows a diagram of the hardware and operating environment in conjunction with which embodiments of the invention may be practiced.

Referring to FIG. 1, a diagram of the hardware and operating environment in conjunction with which embodiments of the invention may be practiced is shown. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCS, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

The hardware and operating environment in conjunction with which embodiments of the invention may be practiced has been described. The computer in conjunction with which embodiments of the invention may be practiced may be a conventional computer, a distributed computer, or any other type of computer; the invention is not so limited. Such a computer typically includes one or more processing units as its processor, and a computer-readable medium such as a memory. The computer may also include a communications device such as a network adapter or a modem, so that it is able to communicatively couple other computers.

Computerized System

In this section of the detailed description, a description of a computerized system according to an embodiment of the invention is provided. The description is provided by reference to FIGS. 2(a) and 2(b). The description is specifically made with reference to siting Component Object Model (COM)-type objects within a Java windowed environment, via a (container) Java object. However, the invention is not so limited; the invention pertains to siting other objects of a first type within a windowed environment, via an object of a second type, as well.

Figure 2A:
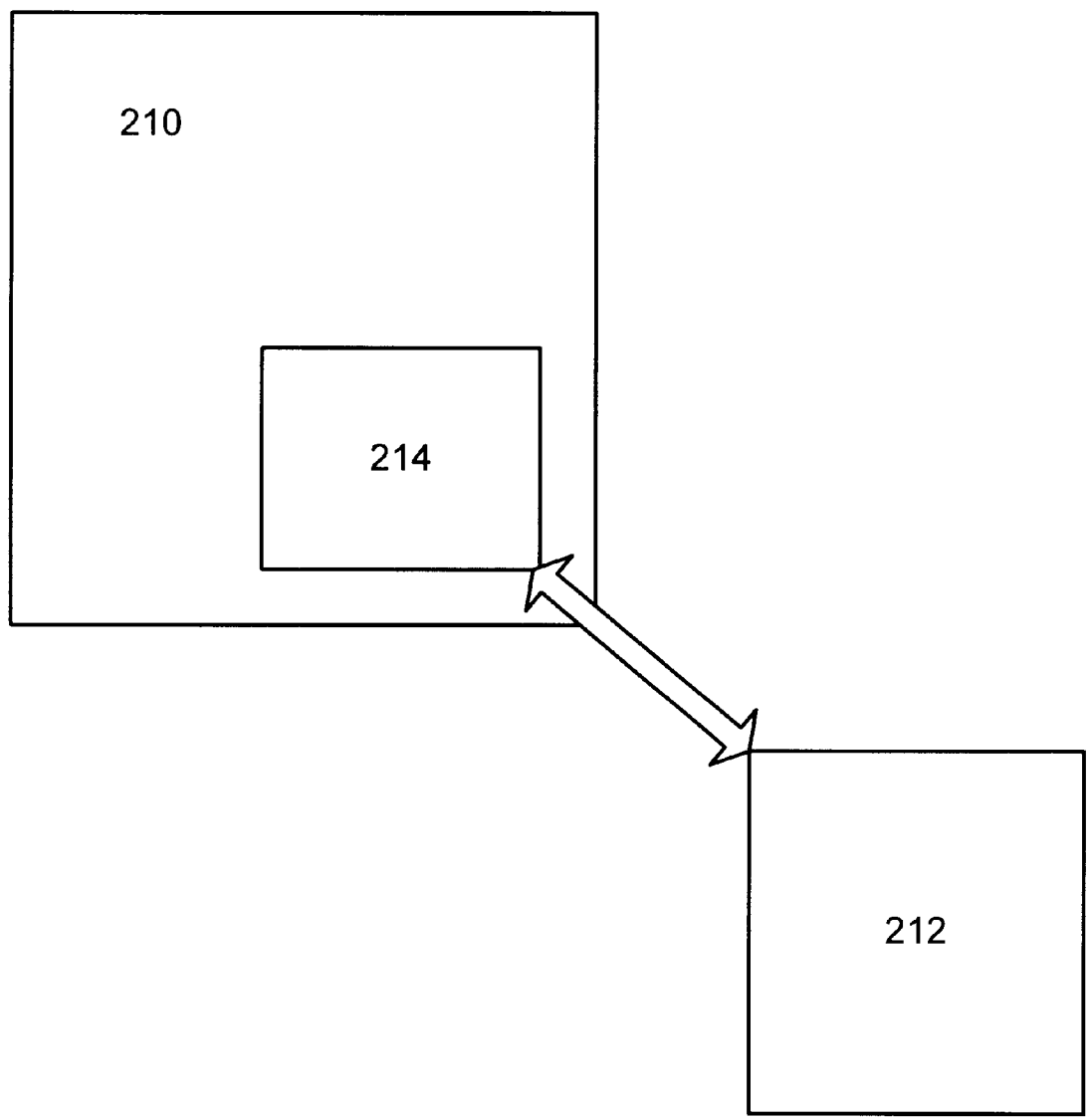
FIG. 2(a) shows a diagram of a computerized system according to one embodiment of the invention.

Referring first to FIG. 2(a), a computerized system according to an embodiment of the invention is shown. The computerized system includes a Java windowed environment 210 (i.e., a Java compatible environment), a COM-type object 212, and a Java object 214. The Java windowed environment 210 is provided by a Java virtual machine, for use with the Java programming language. The Java programming language typically provides for the creation of Java objects, such that one or more objects constitute a particular Java program. The objects are precompiled from a source code into a byte code, which at run-time on a specific type of computer running a Java virtual machine are then compiled by a just-in-time compiler into machine code native to the computer; furthermore, the byte code may also be interpreted by the Java virtual machine, as known within the art.

The invention thus provides for the siting of a COM-type object 212 within the Java windowed environment 210, which is not ordinarily possible, as those of ordinary skill within the art can appreciate. The invention is not limited to any particular type of COM-type object 212. In one embodiment, the object 212 is an ActiveX control, as known within the art. COM objects provide a mechanism for software reuse by allowing the creation of discrete, reusable components. That is, COM objects provide the basic mechanisms needed for one chunk of software to provide services to another through well-defined interfaces implemented by the objects themselves. Each COM object includes at least one interface, each interface having associated methods. Other objects call the COM object's methods via the associated interfaces. Data within the COM object is thus hidden to other objects calling the object (these other objects known as clients).

The COM-type object 212 is sited within the Java windowed environment 210 via a Java object 214. Java objects are, in the context of the Java programming language, instances of a given class. A class is a collection of methods that operate on data, such that the data and the methods, taken together, serve to define the contents and capabilities of the objects instantiated from that class. Java objects, such as the Java object 214, are specifically utilizable within the Java programming language, and thus the Java windowed environment 210.

More specifically, the Java object 214 is a container object that enables the siting of the COM-type object 212 within the Java windowed environment 210. That is, the Java object 214 "wraps" the COM-type object 212 so that the object 212 may be used within the Java windowed environment 210. Insofar as the Java windowed environment 210 is concerned, however, it is interfacing with Java object 214 (that is, other Java objects believe that they are interfacing with Java object 214).

The Java object 214 is therefore a unique Java object to specifically site the COM-type object 212 within the Java windowed environment 210. Because there is no specific concept of siting within Java, the Java object 214 may have to have attributes and interfaces in order to site the COM-type object within the Java windowed environment 210 that otherwise would not be required in the case of siting the COM-type object 212 within its ordinary COM windowed environment. For example, the COM-type object 2122 may require font information, that is typically provided by its corresponding windowed environment, and which is not typically provided by the Java windowed environment 210. In this case, a font is dispatched into the Java object 214 so that the COM-type object 212 has access to this information.

The Java object 214 is desirably dynamically created as a given COM-type object 212 is called. Furthermore, it is deleted (and subsequently recreated) as is necessary. The Java object 214 exists only to site the COM-type object 212 so that it may be used within the Java windowed environment 210. The invention is not limited to a particular manner by which the Java object 214 sites the COM-type object 210 within the Java windowed environment 210; in one embodiment, this is performed in accordance with the method described in a following section of the detailed description, and in accordance with the diagram of FIG. 2(b) that is now described.

Figure 2B:
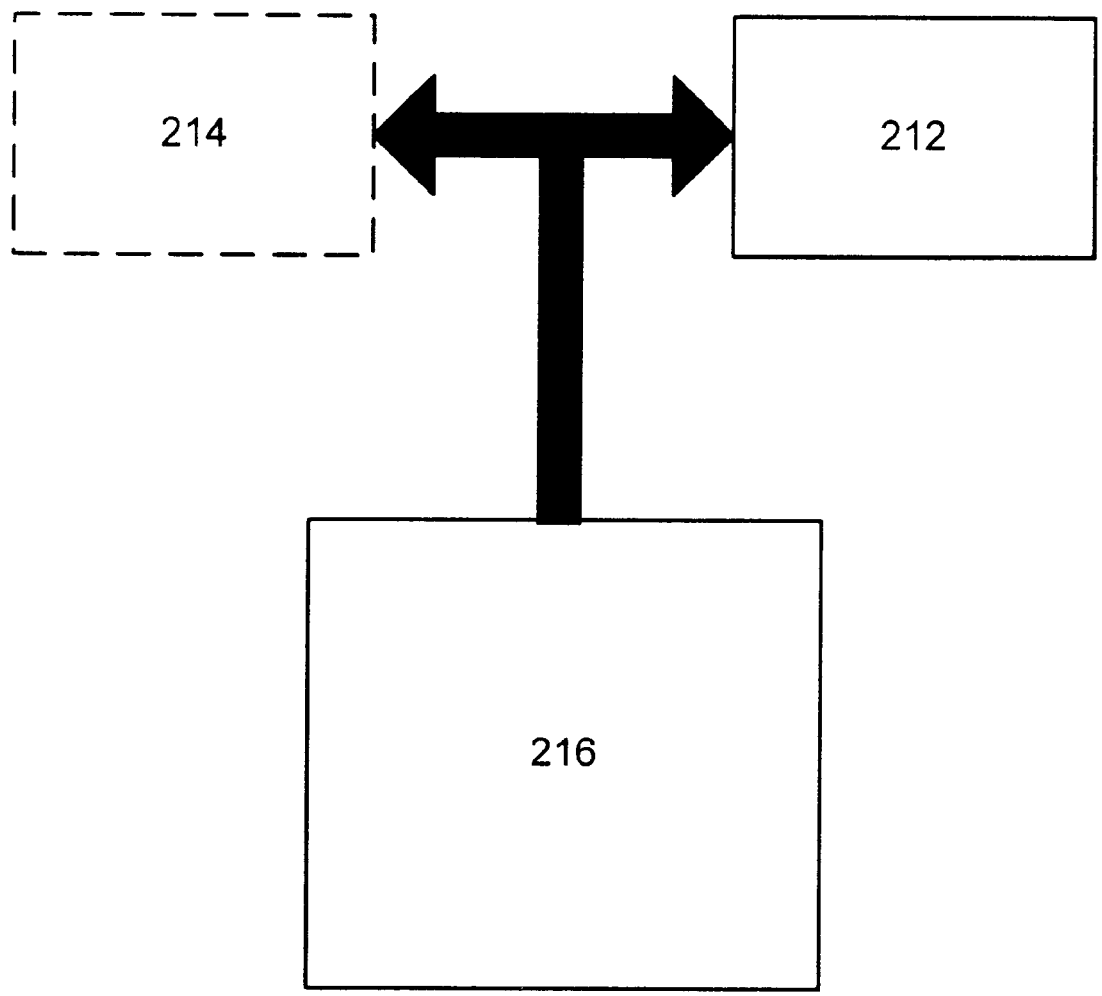
FIG. 2(b) shows a diagram illustrating the manner by which a look-up table is utilized in accordance with one embodiment of the invention; and, FIG. 3 shows a flowchart illustrating a method according to one embodiment of the invention.

Referring next to FIG. 2(b), a diagram illustrating the manner by which a Java object sites a COM-type object within a Java windowed environment, according to one embodiment of the invention, is shown. The COM-type object 212 includes attributes such as various properties, methods and events, as those of ordinary skill within the art can appreciate, that must be properly translated to corresponding Java properties, methods and events so that the Java object 214 is able to site the COM-type object 212 within the Java windowed environment. In accordance with the embodiment of FIG. 2(b), this is accomplished via a look-up table 216, as is now described.

The COM-type object 212 may be one of two types: an early-binding object, or a late-binding object. An early-binding object specifies the interfaces of that object that are accessible to calling objects (i.e., clients) at run-time, such which subsequent to the initial execution of a given object, the interfaces of the object does not vary. Conversely, a late-binding object specifies the interfaces of that object that are accessible to client objects throughout its execution—that is, the interfaces accessible to clients can change, in part depending on the demands of the clients themselves in their continual access of the COM-type object. Because of this, the look-up table 216 varies in accordance with whether the COM-type object 212 is an early-binding or a late-binding object.

In the case of a COM-type object 212 that is an early-binding object, the look-up table 216 is a static look-up table, created at run-time. Thus, at run-time, the COM-type object 212 is queried to learn of all its interfaces and attributes, and a corresponding Java class file is created, such that the Java object 214 may be instantiated therefrom. The look-table 216 is created, to map the interfaces and attributes of the COM-type object to the instantiated Java object 214. Therefore, as the Java object 214 is called by other Java objects within the Java windowed environment, the look-up table 216 is utilized to map the attributes and the interfaces of the Java object 214 to the COM-type object 212, so that information may pass from the Java object 214 to the COM-type object 212.

In the case of a COM-type object 212 that is a late-binding object, the look-up table 216 is a dynamic look-up table. The variants (subclassing) capability of Java objects, that permit Java objects of the same class to have differing interfaces and attributes, is utilized in this scenario. Thus, at run-time, the look-up table 216 is created, and the COM-type object 212 is queried as before to learn of all known interfaces and attributes of the COM-type object 212. A corresponding in-memory class object is created, and the Java object 214 is instantiated therefrom. The look-table 216 is created also as before, to map the known interfaces and attributes of the COM-type object to the instantiated Java object 214.

However, as other interfaces and attributes of the COM-type object 212 become known during execution, variants (subclasses) of the Java object 214 are created (i.e., variants of the class file are instantiated) that take into account these new interfaces and attributes. The look-up table 216 is dynamically updated to map these new interfaces and attributes to corresponding Java interfaces and attributes. The variants (subclasses), and the dynamic entries of the look-up table 216, are dynamically created and deleted as is necessary. In one embodiment, a marshaling engine, as known within the art, performs the look-ups in the look-up table 216, for both the early binding and late binding COM-type object 212 situations.

The siting of an object of a first type (e.g., a COM-type object) within a windowed environment (e.g., such as that provided by Java) via an object of a second type (e.g., a Java object) has been described. This siting provides for advantages not found in the prior art. For example, the embodiment of the invention described enables the utilization of COM-type objects within a Java windowed environment without rewriting the COM-type object in Java as a Java object. This saves development time, and also renders as unnecessary another round of debugging as might be necessary if an already debugged COM-type object had to be rewritten in Java as a Java object.

Computerized Method

In this section of the detailed description, a computerized method according to an embodiment of the invention is presented. This description is provided in reference to FIG. 3. The description is specifically made with reference to siting Component Object Model (COM)-type objects within a Java windowed environment, via a (container) Java object. However, the invention is not so limited; the invention pertains to siting other objects of a first type within a windowed environment, via an object of a second type, as well. The computerized method is desirably realized at least in part as one or more programs running on a computer that is, as a program executed from a computer-readable medium such as a memory by a processor of a computer. The programs are desirably storable on a computer-readable medium such as a floppy disk or a CD-ROM, for distribution and installation and execution on another (suitably equipped) computer.

Figure 3:
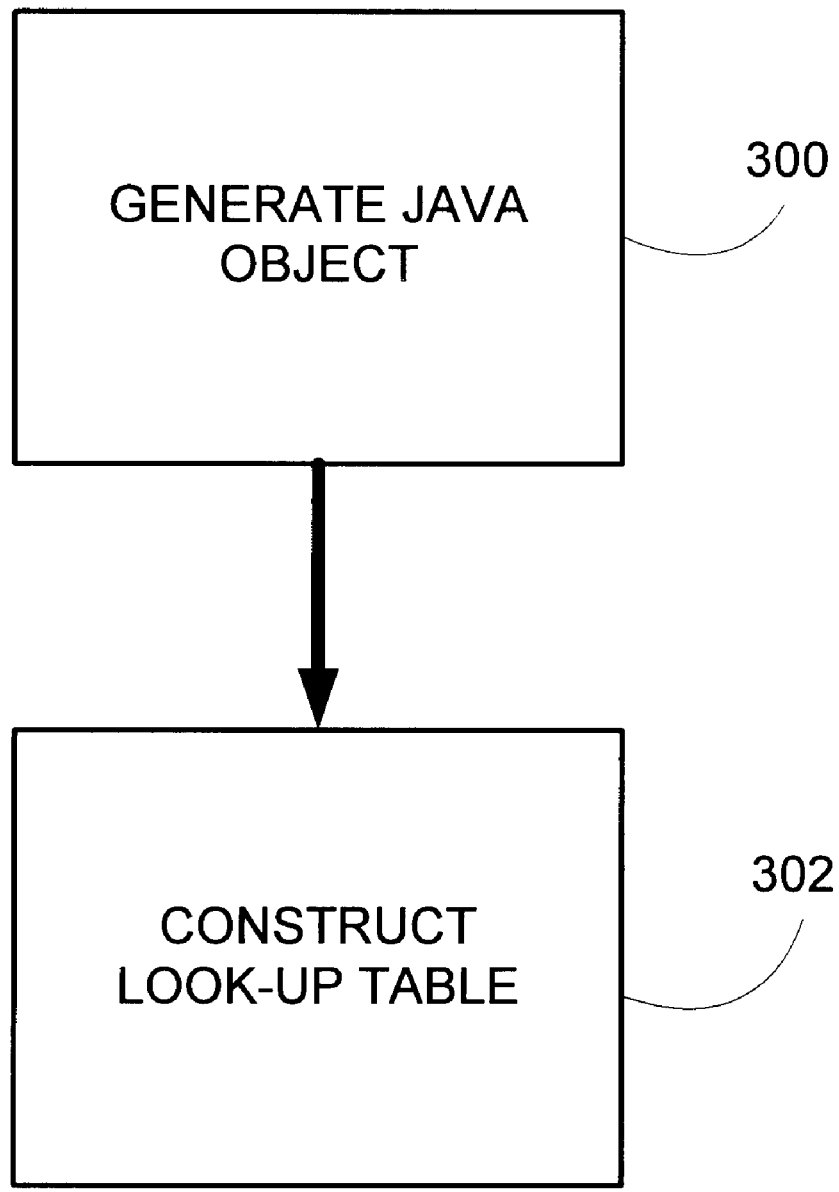

Referring now to FIG. 3, a flowchart of a computerized method according to one embodiment of the invention is shown. In 300, a Java object is generated. That is, a Java object is instantiated from a Java class file. The generated Java object corresponds to a Component Object Model (COM)-type object, such as an ActiveX control, that is to be sited within a Java windowed environment. The Java object wraps the COM-type object so that the latter object may be used within the Java windowed environment. Thus, insofar as the Java windowed environment is concerned, other Java objects believe that they are interfacing with a Java object, although in reality they are interfacing with a COM-type object. The Java object generated in 300 is generated so that the corresponding COM-type object is sited within the Java windowed environment.

In 302, a look-up table is constructed to provide for the siting of the COM-type object within the Java windowed environment. For early-binding COM-type objects, the look-up table is a static table, created at run-time. At run-time, the object is queried to learn of all its interfaces and attributes, such that the look-up table maps the interfaces and attributes of the COM-type object to the instantiated Java object. For late-binding objects, the table is a dynamic table. At run-time, the object is again queried to learn of all its interface and attributes, but the table is also updated during execution, as other interfaces and attributes of the object become known, and the entries within the table are dynamically created and deleted as necessary. The Java object itself, in this latter instance, has variants (subclasses) thereof created to take into account these new interfaces and attributes.

A method according to an embodiment of the invention has been described. Besides the description of the method provided, the method also desirably incorporates the functionality of the system according to one embodiment of the invention that has been provided in the previous section of the detailed description. That is, those of ordinary skill in the art should refer to the previous section of the detailed description when studying the method of this section of the detailed description, to learn of extra functionality that can be provided by the method.

Conclusion

Hosting objects in a windowed environment has been described. In particular the siting of a Component Object Model (COM)-type object within a Java windowed environment, via a Java object, has been presented. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. Therefore, it is manifestly intended that this invention be limited only by the following claims and equivalents thereof.

We claim:

1. A computerized system for siting an object not conforming to an object programming model type of a windowed environment, where said non-conforming object conforms to another object model programming type not otherwise compatible to the object programming model type of the windowed environment, the system comprising:

a display device;

a processor operating under control of an object execution operating program to create the windowed environment for presentation on the display device in which objects conforming to the object programming model type of the windowed environment are sited; and the object execution operating program operating to create for said non-conforming object a container object conforming to the object programming model type of the windowed environment to wrap said non-conforming object such that said non-conforming object is interfaced with via the container object in the windowed environment.

2. The computerized system of claim 1, wherein the object model programming type of the windowed environment is Java-compatible.

3. The computerized system of claim 1, wherein the other object model programming type is Component Object Model (COM).

4. The computerized system of claim 3, wherein the object programming model type of the windowed environment lacks an interface required by the non-conforming object for siting within the other object programming model type of another windowing environment, the system comprising the object execution operating program creating the container object to include said required interface lacking from the windowed environment for use in siting the non-conforming object in the windowed environment.

5. The computerized system of claim 1, wherein the object programming model type of the windowed environment lacks information required by the non-conforming object for siting within the other object programming model type of another windowed environment, the system comprising the object execution operating program creating the container object to include an interface and attribute for supplying said required information lacking from the windowed environment for use in siting the non-conforming object in the windowed environment.

6. The computerized system of claim 1, wherein the non-conforming object comprises an early binding object having a set of interfaces that remain invariant subsequent to initial execution of said object.

7. The computerized system of claim 6, further comprising the object execution operating program further operating to query said non-conforming object upon execution thereof to discover interfaces and attributes thereof, to create a class file of the container object, and to create a static look-up table configured to map the discovered interfaces and attributes of the non-conforming object to corresponding interfaces and attributes of the container object.

8. The computerized system of claim 7, wherein the attributes comprise at least one attribute of the group essentially consisting of: properties, methods, and events.

9. The computerized system of claim 1, wherein the non-conforming object comprises a late binding object having a set of interfaces accessible to clients that varies during execution.

10. The computerized system of claim 9, further comprising the object execution operating program further operating to query said non-conforming object upon execution thereof to discover interfaces and attributes thereof, to create a class file of the container object, and to create a dynamic look-up table configured to map the discovered interfaces and attributes of the non-conforming object to corresponding interfaces and attributes of the container object the object execution operating program further operating to discover differing interfaces and attributes of said non-conforming object made accessible to clients during said non-conforming object's run-time, to create a sub-class of the class file taking into account the differing interfaces and attributes, and to dynamically update the dynamic look-up table to map the differing interfaces and attributes of the non-conforming object to corresponding interfaces and attributes of the container object.

11. The computerized system of claim 10, wherein the attributes comprise at least one attribute of the group essentially consisting of: properties, methods, and events.

12. In a computer, a method of siting an object not conforming to an object programming model type of a windowed environment, where said non-conforming object conforms to another object model programming type not otherwise compatible to the object programming model type of the windowed environment, the method comprising:

under control of an object execution operating program running on the computer:
creating the windowed environment for presentation on a display device in which objects conforming to the object programming model type of the windowed environment are sited;
for said non-conforming object, creating a container object conforming to the object programming model type of the windowed environment to wrap said non-conforming object such that said non-conforming object is interfaced with via the container object in the windowed environment.

13. The method of claim 12, wherein the object programming model type of the windowed environment lacks an interface required by the non-conforming object for siting within the other object programming model type of another windowing environment, the method further comprising, under control of an object execution operating program running on the computer:
creating the container object to include said required interface lacking from the windowed environment for use in siting the non-conforming object in the windowed environment.

14. The method of claim 12, wherein the object programming model type of the windowed environment lacks information required by the non-conforming object for siting within the other object programming model type of another windowed environment, the method further comprising, under control of an object execution operating program running on the computer:
creating the container object to include an interface and attribute for supplying said required information lacking from the windowed environment for use in siting the non-conforming object in the windowed environment.

15. The method of claim 12, wherein the non-conforming object comprises an early binding object having a set of interfaces that remain invariant subsequent to initial execution of said object, the method further comprising, under control of an object execution operating program running on the computer:
querying said non-conforming object upon execution thereof to discover interfaces and attributes thereof;
creating a class file of the container object; and
creating a static look-up table configured to map the discovered interfaces and attributes of the non-conforming object to corresponding interfaces and attributes of the container object.

16. The method of claim 12, wherein the non-conforming object comprises a late binding object having a set of interfaces accessible to clients that varies during execution, the method further comprising, under control of an object execution operating program running on the computer:
querying said non-conforming object upon execution thereof to discover interfaces and attributes thereof;
creating a class file of the container object;
creating a dynamic look-up table configured to map the discovered interfaces and attributes of the non-conforming object to corresponding interfaces and attributes of the container object;
discovering differing interfaces and attributes of said non-conforming object made accessible to clients during said non-conforming object's run-time;
creating a sub-class of the class file taking into account the differing interfaces and attributes; and
dynamically updating the dynamic look-up table to map the differing interfaces and attributes of the non-conforming object to corresponding interfaces and attributes of the container object.

17. A computer-readable data carrying medium having carried thereon an object execution operating program for execution on a computer for siting an object not conforming to an object programming model type of a windowed environment, where said non-conforming object conforms to another object model programming type not otherwise compatible to the object programming model type of the windowed environment, the object execution operating program comprising:

program code instructions for creating the windowed environment for presentation on a display device in which objects conforming to the object programming model type of the windowed environment are sited;

program code instructions creating, for said non-conforming object, a container object conforming to the object programming model type of the windowed environment to wrap said non-conforming object such that said non-conforming object is interfaced with via the container object in the windowed environment.

18. The computer-readable data carrying medium of claim 17, wherein the object programming model type of the windowed environment lacks an interface required by the non-conforming object for siting within the other object programming model type of another windowing environment, the object execution operating program further comprising:

program code instructions for creating the container object to include said required interface lacking from the windowed environment for use in siting the non-conforming object in the windowed environment.

19. The computer-readable data carrying medium of claim 17, wherein the object programming model type of the windowed environment lacks information required by the non-conforming object for siting within the other object programming model type of another windowed environment, the object execution operating program further comprising:

program code instructions for creating the container object to include an interface and attribute for supplying said required information lacking from the windowed environment for use in siting the non-conforming object in the windowed environment.

20. The computer-readable data carrying medium of claim 17, wherein the non-conforming object comprises an early binding object having a set of interfaces that remain invariant subsequent to initial execution of said object, the object execution operating program further comprising:

program code instructions for querying said non-conforming object upon execution thereof to discover interfaces and attributes thereof;

program code instructions for creating a class file of the container object; and program code instructions for creating a static look-up table configured to map the discovered interfaces and attributes of the non-conforming object to corresponding interfaces and attributes of the container object.

21. The computer-readable data carrying medium of claim 17, wherein the non-conforming object comprises a late binding object having a set of interfaces accessible to clients that varies during execution, the object execution operating program further comprising:

program code instructions for querying said non-conforming object upon execution thereof to discover interfaces and attributes thereof;

program code instructions for creating a class file of the container object;

program code instructions for creating a dynamic look-up table configured to map the discovered interfaces and attributes of the non-conforming object to corresponding interfaces and attributes of the container object;

program code instructions for discovering differing interfaces and attributes of said non-conforming object made accessible to clients during said non-conforming object's run-time;

program code instructions for creating a sub-class of the class file taking into account the differing interfaces and attributes; and program code instructions for dynamically updating the dynamic look-up table to map the differing interfaces and attributes of the non-conforming object to corresponding interfaces and attributes of the container object.

\* \* \* \* \*